United States Patent
Mizue et al.

(10) Patent No.: US 7,350,979 B2
(45) Date of Patent: Apr. 1, 2008

(54) OPTICAL TRANSCEIVER HAVING AN OPTICAL RECEPTACLE OPTIONALLY FIXED TO A FRAME

(75) Inventors: Toshio Mizue, Yokohama (JP); Manabu Ishikawa, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 556 days.

(21) Appl. No.: 10/777,766

(22) Filed: Feb. 13, 2004

(65) Prior Publication Data

US 2005/0180754 A1    Aug. 18, 2005

(51) Int. Cl.
*G02B 6/36* (2006.01)

(52) U.S. Cl. .......................... 385/53; 385/55; 385/70; 385/71

(58) Field of Classification Search .................. 385/53
See application file for complete search history.

(56) References Cited

U.S. PATENT DOCUMENTS

| | | | |
|---|---|---|---|
| 5,202,943 A | | 4/1993 | Carden et al. |
| 5,280,191 A * | | 1/1994 | Chang ........................ 257/712 |
| 6,540,412 B2 * | | 4/2003 | Yonemura et al. ............. 385/88 |
| 6,830,383 B2 * | | 12/2004 | Huang ......................... 385/92 |
| 6,867,368 B2 * | | 3/2005 | Kumar et al. ................ 174/524 |
| 6,884,097 B2 | | 4/2005 | Ice |
| 6,884,997 B2 | | 4/2005 | Kashima et al. |
| 2001/0024551 A1 * | | 9/2001 | Yonemura et al. ............. 385/88 |
| 2003/0072540 A1 * | | 4/2003 | Huang ......................... 385/92 |
| 2003/0091349 A1 * | | 5/2003 | Sato et al. ................... 398/135 |
| 2005/0180754 A1 | | 8/2005 | Mizue et al. |

OTHER PUBLICATIONS

U.S. Appl. No. 11/374,422, filed Mar. 14, 2006.
U.S. Appl. No. 11/258,365, filed Oct. 26, 2005.

* cited by examiner

*Primary Examiner*—Frank G. Font
*Assistant Examiner*—Mary El-Shammaa
(74) *Attorney, Agent, or Firm*—Smith, Gambrell & Russell, LLP

(57) ABSTRACT

The present invention provides an optical transceiver that has an optical semiconductor device coupled to an optical fiber via an optical connector attached to an end of the optical fiber. The optical transceiver comprises at least one optical subassembly including the optical semiconductor device, an optical receptacle, a substrate, a frame and a cover. The optical semiconductor device optically couples to the optical fiber by mating the optical connector with the optical receptacle. The frame installs the optical subassembly, the optical receptacle, and the frame. According to the present invention, the optical receptacle is optionally positioned to the frame, so mechanical stress induced therebetween may be relaxed.

14 Claims, 8 Drawing Sheets

OPTICAL TRANSCEIVER HAVING AN OPTICAL RECEPTACLE OPTIONALLY FIXED TO A FRAME

BACKGROUND OF THE INVENTION

1. Field of the Invention

The present invention relates to an optical transceiver that receives and sends signal light transmitted in an optical fiber.

2. Related Prior Art

A conventional optical transceiver comprises a frame, an optical receptacle, an optical subassembly, a substrate for installing an electronic circuit, and a cover. The frame supports the optical receptacle, the optical subassembly and the substrate. Within the optical subassembly, a semiconductor optical device is installed for sending/receiving signal light. The head portion of the optical subassembly is positioned in the optical receptacle. When an optical connector mate with the optical receptacle, an optical fiber in the optical connector optically couples to the optical subassembly in the optical receptacle, thereby coupling the optical fiber to the semiconductor device mounted in the optical subassembly. The electronic circuit receives an electric signal from the outside of the optical transceiver, reshapes this signal and sends the reshaped signal to the optical subassembly, or the electronic circuit receives an electric signal from the optical subassembly, amplifies this signal and output the amplified signal to the outside of the optical transceiver. The cover not only protects the optical receptacle, the optical subassembly and the substrate but also effectively dissipates heat generated within the optical transceiver to the outside.

The shape of the optical receptacle, including the head portion of the optical subassembly that is placed in the optical receptacle, is regulated by the standard of the optical connector. Namely, the positional relation between the optical receptacle and the optical subassembly must be in accordance with the standard of the optical connector. This positional relation must have an accuracy of a few tenths of micron meters to maintain the optical coupling efficiency therebetween, whereby the optical subassembly and the optical receptacle are necessary to fix rigidly to the frame.

On the other hand, the substrate provides an electrical plug in a side opposing to the optical subassembly for mating with an electrical connector provided on the main board where the optical transceiver is installed thereon. The relative position to the frame and the cover of this electrical plug is also in accordance with the standard of the electrical connector, whereby the substrate is rigidly fixed to the frame. Moreover, from a viewpoint of heat dissipation, a primary portion of the optical subassembly, where the semiconductor optical device is installed thereon, is preferable to be rigidly fixed to the frame. Thus, the optical receptacle, the optical subassembly and the substrate, these are mounted on the frame, are strictly requested in their dimensions and positions on the frame. However, some tolerance always accompanies in the design and the assembly of these parts, and in the conventional optical transceiver, this tolerance is only compensated by the connection between the optical assembly and the substrate. Accordingly, mechanical stress concentrates on a portion where the optical subassembly is connected to the substrate, which results on inferior reliability. The optical subassembly may be fixed to the frame via an elastic material as a cushion to relax the mechanical distortion therebetween. However, such elastic material generally has less thermal conductivity.

SUMMARY OF THE INVENTION

According to one aspect of the present invention, a transceiver module comprises at least one optical subassembly, an optical receptacle, a substrate, a frame and a cover. The subassembly includes an optical semiconductor device that couples to an optical fiber with an optical connector attached to an end thereof. A head portion of the optical subassembly positions in the optical receptacle, while the optical connector mates with the optical receptacle. Thus the optical fiber may optically couples to the optical semiconductor device. The frame installs the optical receptacle, the optical subassembly and the substrate thereof The substrate is electrically connected to the optical subassembly. The optical subassembly and the substrate are rigidly fix to the frame. On the other hand, the optical receptacle is optionally positioned to the frame.

The frame may have a hole with a thread in an inner surface thereof and the optical receptacle may have another hole with no thread in an inner surface thereof. These holes provided in the frame and the optical receptacle cooperate with each other and form a screw hole. The optical receptacle may be optionally positioned to the frame by a screw tightened in this screw hole. Alternatively, the optical receptacle may be optionally positioned to the frame by adhesive filled gap formed therebetween.

The frame may be made of metal, while the optical receptacle may be made of resin or resin coated with conductive material. When the optical receptacle is positioned to the frame by the screw, the position of the optical receptacle is optionally decided to the frame because the optical receptacle is made of resin which is more flexible than metal.

Another aspect of the present invention, an optical transceiver module comprises a transmitting optical subassembly, a receiving optical subassembly and a substrate. The optical transmitting subassembly has a primary portion with a box-shape and a plurality of lead terminals, and installes a laser diode. The optical receiving subassembly has a primary portion with a co-axial shape and a flexibly circuit board, and installs a photodiode. The substrate includes a plurality of electronic elements thereon. The transmitting optical subassembly is electrically connected to the substrate via the lead terminals, while the receiving optical subassembly is electrically connected to the substrate via the flexible circuit board.

In this arrangement of the transceiver module, since the transmitting optical subassembly has the box-shaped primary portion, a thermoelectric element may be installed therein, and rigidly fixed to the frame, which enables to dissipate heat generated by the laser diode to the outside of the transceiver module.

DETAILED DESCRIPTION OF PREFERRED EMBODIMENTS

Figure 1:
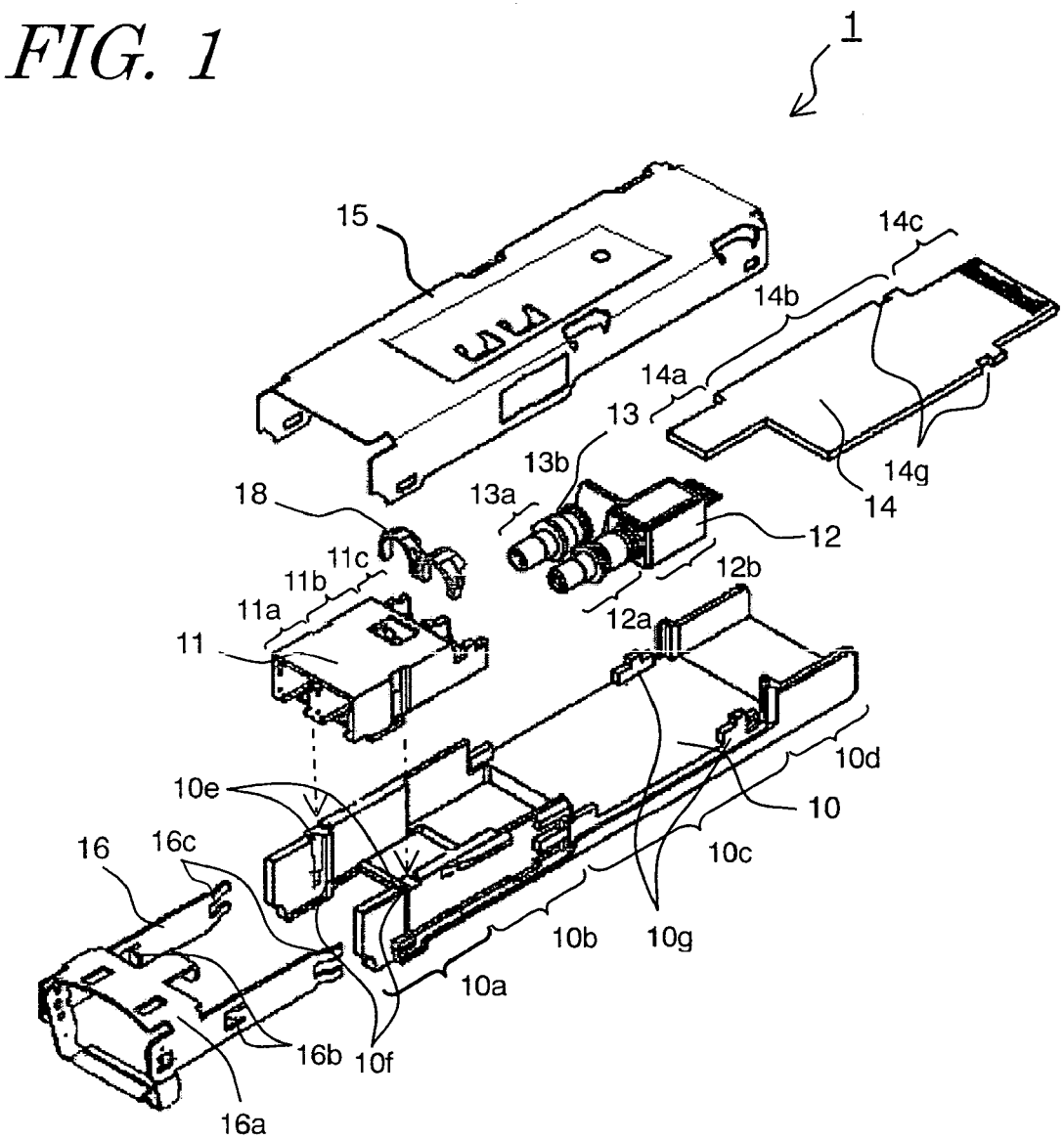
FIG. 1 is an exploded view of the optical transceiver module according to the present invention from the front side thereof.

Next, preferred embodiments of the present invention will be described in detail as referring to accompany drawings. In the drawings, same elements will be referred by same numerals or symbols without overlapping explanation.

First Embodiment

Figure 2:
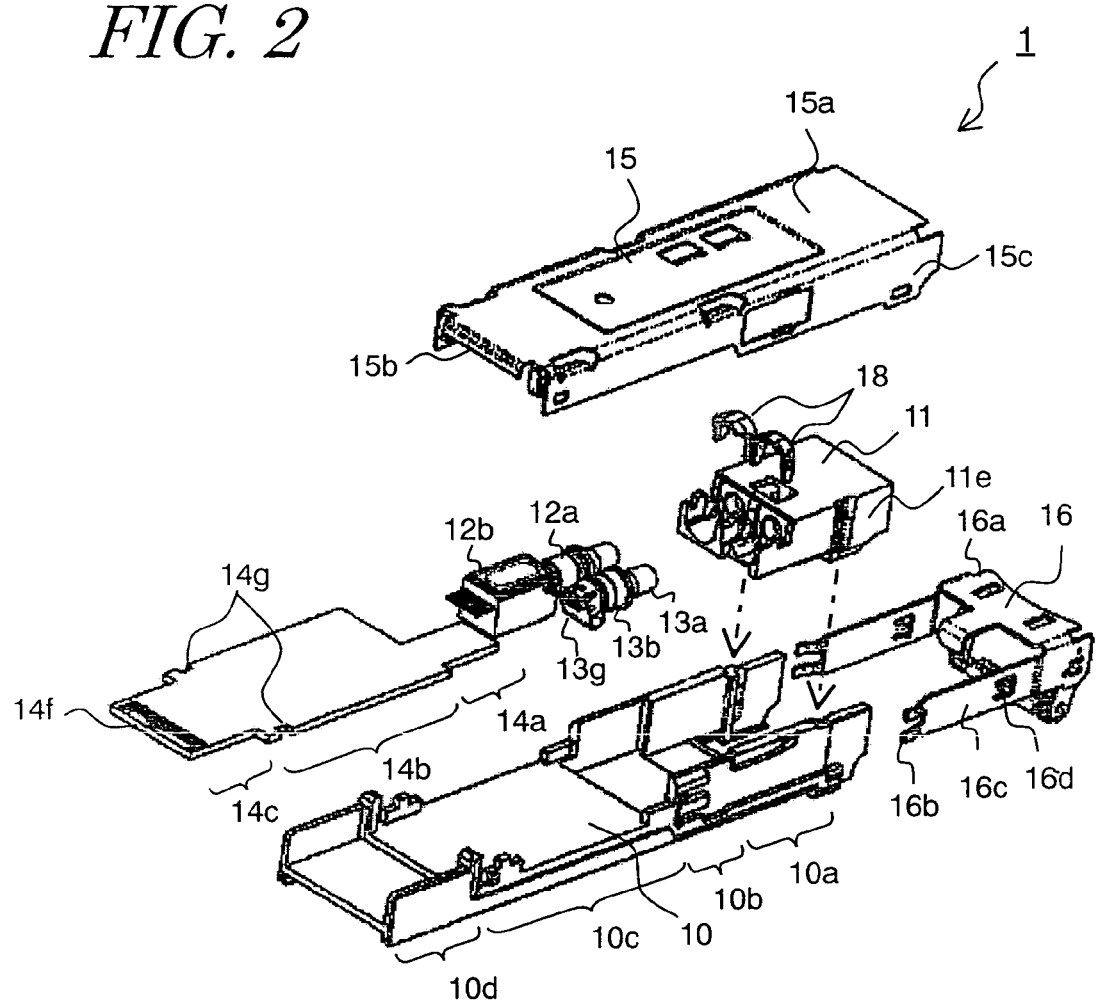
FIG. 2 is an exploded view of the optical transceiver module from the rear side thereof.

FIG. 1 and FIG. 2 are exploded views of an optical transceiver 1 according to the present invention. FIG. 1 is a view from the front side, while FIG. 2 is a view from the rear side. The front and the rear are expediently denoted, and the side where an optical connector is mated is denoted as the front side, and the side where an electrical connector is disposed is denoted as the rear side. The optical link 1 comprises a frame 10, an optical receptacle 11, a pair of optical subassemblies 12 and 13, a substrate 14, a cover 15 and an actuator 16.

The frame 10 is made of metal, conductive resin or insulating resin with metal coating. The frame 10 includes four portions 10a to 10d from the front side to the rear side. Among these portions, only the third portion 10c has no sidewalls. The first portion 10a disposes the optical receptacle 11 thereon, while the third portion disposes the pair of optical subassemblies 12 and 13. A primary portion of the substrate, where circuit elements are mounted, is disposed in the third portion 10c, and a plug portion of the substrate 14 disposes the fourth portion 10d of the frame 10. In the outer surface of sidewalls in the first portion 10a and the second portion 10b, a plurality of projections and grooves are formed to engage the actuator 16. In the inner surface of the sidewalls of the first portion 10a, a bore 10e with a thread and a lib 10f are formed to define position of the optical receptacle 11.

The optical receptacle 11 comprises a first to third portions 11a to 11c from the front side to the rear side. In the first portion 11a, two openings with a substantially rectangular cross section are formed for transmission and reception, respectively, to receive an optical plug attached to the tip portion of the optical connector mating thereto. The bottom of the opening reaches the second portion 11b of the optical receptacle. The cross section of the opening depends on a specification of the optical connector. Between the second portion 11b and the third portion 11c has a partition wall. The partition wall has openings for optical subassemblies 12 and 13. Namely, the head portion of the optical subassembly 12, 13 reaches the second portion 11b passing through the bore and optically couples to the optical plug in the second portion 11b. The third portion 11c has structure for securing the optical subassemblies by outer surface thereof. Between these structure has a partition wall, which is a part of the securing structure for the optical subassemblies 12 and 13. The optical subassemblies 12 and 13 are positioned by these structures and tightly fixed to the optical receptacle 11 by a holder 18. In outer surfaces of the optical receptacle at the boundary between the first portion 11a and the second portion 11b, a bore 11e without any thread and a groove 11f are formed to define the relative position of the frame 10 and the optical receptacle 11. The lib 10f in the frame 10 is inserted into the groove 11f in the optical receptacle 11, thereby defining the relative position between the frame 10 and the optical receptacle 11 and forming a composite bore of the bore 10e and another bore 11e, and finally to insert a screw into this composite bore fixes the optical receptacle 11 to the frame 10.

The optical subassemblies 12, 13 include a transmitting-optical subassembly (hereinafter denoted as the TOSA) and a receiving-optical subassembly (hereinafter denoted as the ROSA). Within the TOSA 12, a semiconductor laser is contained as a light-emitting device, while within the ROSA 13, a photodiode is contains as a light-receiving device. The respective subassemblies 12, 13 provide a sleeve portion 12a, 13a for receiving an optical ferrule attached to a tip of the optical fiber, and a primary portion 12b, 13b for containing semiconductor devices, respectively. The sleeve portion 12a, 13a has a flange and a groove in the outer surface thereof. When the head of the sleeve portion 12a, 13a is inserted to the opening formed in the partition wall between the second portion 11b and the third portion 11c of the optical receptacle, the flange of the sleeve portion 12a, 13a abuts to the partition wall, which defines the position of the subassemblies 12, 13 in a direction of the optical axis (hereinafter denoted as the Z axis).

For the TOSA 12, the primary portion 12b is positioned in the second portion 10b of the frame 10, while the sleeve portion 12a thereof is fixed to the structure formed in the third portion 11c of the optical receptacle 11. For the ROSA 13, the primary portion 13b and the sleeve portion 13a thereof are both fixed on the third portion 11c of the frame 11, because the ROSA 13 has a substantially disk shape in its external form. The holder 18 is inserted in the groove in the sleeve portion 12a, 13a of the subassemblies 12, 13. By fixing thus inserted holder 18 to the optical receptacle 11, the subassemblies 12, 13 are tightly fixed to the optical receptacle 11. Within the primary portion 12a of the TOSA 12, a thermoelectric element is disposed to control temperatures of the semiconductor laser. To secure a space for disposing the thermoelectric element, the primary portion 12a of the TOSA 12 has a box shape. Electrical connection to circuit elements installed on the substrate 14 is performed by lead terminals extending from the rear side of the primary portion 12a. On the other hand, the outer shape of the primary portion 13a of the ROSA 13 has a disc shape, a center of which disposes the photodiode thereon. Electrical connection to circuit elements is performed by a flexible circuit board.

The substrate 14 is disposed on the third portion 10c of the frame 10 and includes first to third portions 14a to 14c from the front side to the rear side. The first portion 14a defines the rear position of the TOSA 12 and the ROSA 13. The ROSA, the primary portion 13b of which is a co-axial shape, positions its rear edge in the optical receptacle 11, which is apart almost the length of the second portion 10b of the frame from the rear edge of the TOSA 12. Accordingly, the first portion 14a of the substrate 14 extends from the third portion 10c of the frame 10, fully covers the second portion 10b, reaches the rear edge of the ROSA 13, and is connected to the flexible substrate extending from the rear edge of the ROSA 13.

On the second portion 14b of the substrate 14 installs a plurality of circuit components for the signal transmission and reception. A pair of notch 14g is formed in the rear of both edges of the substrate 14. The notch 14g mates with the projection provided in the third portion 10c of the frame 10, thereby defining the positional relation between the frame 10 and the substrate 14. The third portion 14c of the substrate 14 extends from the rear of the second portion 14b, and positions in the fourth portion 10d of the frame 10. On the third portion 14c, the electrical plug pattern 14h is formed in the rear edge thereof, which mates with the electrical connector installed on the main board.

The cover 15 comprises a pair of sides 15b, 15c and a ceiling 15a connecting respective sides 15b and 15c. The cover is made of metal such as stainless steel. A portion of the ceiling 15a is bent toward the frame 10, which forms a spring leaf. The tip portion of this spring leaf is in contact with the primary portion 12b of the TOSA 12 and presses the TOSA 12 to the frame 10.

The actuator 16 is also made of stainless steel, which releases the optical transceiver 1 secured and locked in the cage provided on the main board: The actuator 16 comprises a frame 16a surrounding the opening of the optical receptacle 11 and a pair of arms 16b extending from the frame 16a. Respective arms 16b sandwich the sidewalls of the first and second portions 10a, 10b of the frame 10 therebetween. The latch 16c provided the tip of the arm 16b and the stopper 16d in the arm 16b perform the releasing mechanism of the optical transceiver 1 combined with a plurality of projections provided in the sidewalls.

Figure 3A:
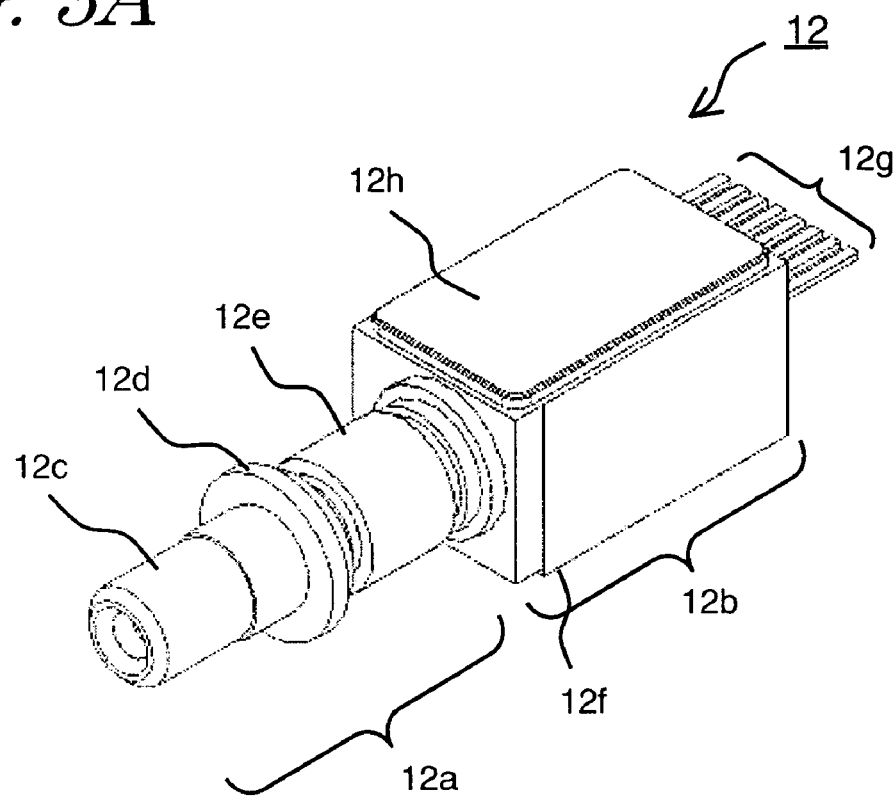
FIG. 3A is a perspective view of the transmitting optical subassembly of the present invention.
Figure 3B:
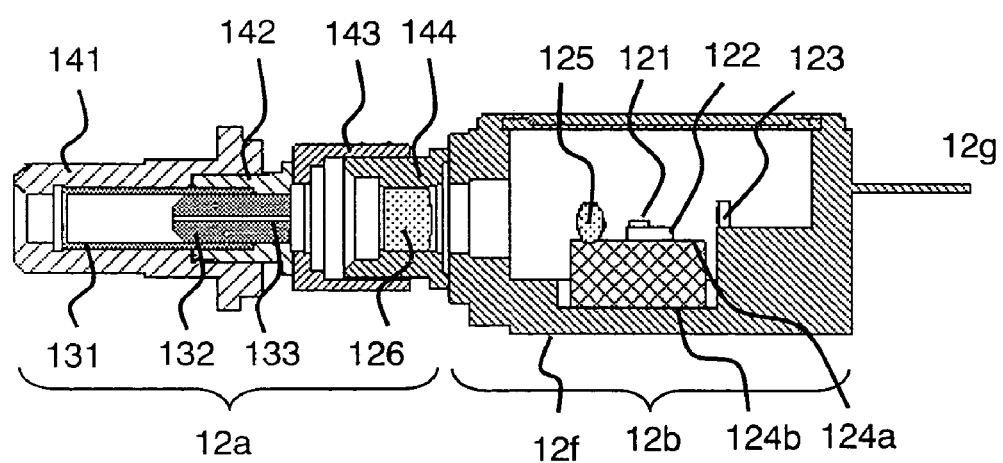
FIG. 3B is a cross sectional view of the transmitting optical subassembly.

Next, a structure of the TOSA 12 will be described in detail. FIG. 3A is a perspective view of the TOSA 12 and FIG. 3B is a cross section of the TOSA 12. The TOSA 12 comprises a sleeve portion 12a and a primary portion 12b. The sleeve portion 12b further comprises a plural outer structure from 12c to 12e. The head portion 12c, inserted into the opening provided in the partition wall between the second portion 11b and the third portion 11c of the optical receptacle, positions its end in the opening of the optical receptacle 11. One surface of the flange 12d touches the partition wall, whereby the positional relation between the optical receptacle 11 and the TOSA 12 in a direction of the optical axis Z is defined.

As shown in FIG. 3B, the sleeve portion 12a comprises a plurality of cylindrical members serially combined to each other. From a side of the optical connector, namely from the tip of the sleeve portion 12a, a first to fourth cylindrical members 141 to 143 are combined and one surface of the fourth component 144 is fixed to the sidewall of the primary portion 12b. A sleeve 131 is arranged within the first cylindrical member 141, and a stub 132 is inserted in the sleeve 131 at the side for the primary portion 12b. Outer surface of the first cylindrical member 131 provides the flange 12d.

The second cylindrical member 142 covers the stub 132 and the portion of the sleeve 131, the side for the primary portion 12b, so as to fill a gap between the inner surface of the first cylindrical member 142 and the stab 132. Because the second cylindrical member 142 is inserted between the stub 132 and the first cylindrical member 141 and holds the stub 132, the sleeve 131 is firmly fixed in the first cylindrical member 141. Thus, the sleeve 131 and the stub 132 are coupled with a positional accuracy of 1 µm or less.

In the center of the stub 132 provides an coupling fiber 133 with a tip surface thereof coincide with that of the stub 132, thereby enabling physical contact between the stub 132 and the optical ferrule attached to the tip of the optical fiber when the optical connector mates with the optical receptacle 11. The rigid sleeve without any slits is typically used for the sleeve 131. However, a split sleeve with a slit along the axis thereof may be also applicable to the sleeve 131. Zirconia ceramics is preferably used for such non-split sleeve or split sleeve.

An end surface of the third cylindrical member 143 at the side of the optical connector is processed in an optical flatness. The end surface of the second cylindrical member 142 at the side for the primary portion 12b is also processed in the optical flatness, so that the second cylindrical member 142 may be aligned in the X and Y directions on the third cylindrical member 143. The X and Y directions are normal to the optical axis, which is parallel to the coupling fiber, and the direction Y is perpendicular to the primary surface of the frame 10. The third cylindrical member 143 covers the fourth cylindrical member 144 at the side of the primary portion 12b. A diameter of the bore of the third cylindrical member 143 is slightly greater than an outer diameter of the fourth cylindrical member 144, and both surfaces, the inner surface of the third component 143 and the outer surface of the fourth component 144, are processed in the optical flatness.

By sliding the third cylindrical member 143 on the outer surface of the fourth cylindrical member 144, an optical alignment along a direction Z is performed. Within the fourth cylindrical member 144 provides a second lens. The fourth cylindrical member 144 acts as a lens holder. These cylindrical members 141 to 144 are made of metal, and each are welded by YAG laser after two step optical alignment is completed.

As shown in FIG. 3B, the primary portion 12b of the TOSA 12 is box-like shape with a bottom thereof facing the third portion 10c of the frame 10. The primary portion 12b installs a thermoelectric cooler 124, on which a semiconductor laser 121 is mounted through a heat sink 122 as a light-emitting element. A Peltier element is preferably applicable for the thermoelectric element 124. On the thermoelectric element 124 also installs a first lens 125. A photodiode 123 is installed via the sub-mount behind the semiconductor laser 121 for monitoring the optical output power thereof. The photodiode 123 and the sub-mount are not arranged on the thermoelectric element 124.

The thermoelectric element 124 may change its function by the supplying current. Namely, one electrode 124a on which the semiconductor laser is mounted may be heated or cooled by the direction of current flowing. Generally, when the laser diode operates by providing the bias and the modulation current thereto, the current to the thermoelectric element flows such that the electrode on which the laser is mounted acts as a cooler to compensate self-heating of the semiconductor laser 121. In this case, another electrode 124b of the thermoelectric element acts as a heater. Heat generated in the primary portion 12b of the TOSA 12, must be effectively dissipated from the bottom 124b to the outside of the TOSA 12. Accordingly, the bottom 12f of the primary portion 12b is glued to the third portion 10c of the frame 10. The rear side of the primary portion 12b provides a plurality of lead terminals 12g for inputting an electric signal to the semiconductor laser 121 and for outputting a monitored signal corresponding to the output power of the semiconductor laser detected by the photodiode 123.

As shown in FIG. 3B, the position of the optical axis in the Y-direction is uniquely determined by the level of the semiconductor laser 121 from the bottom 12f of the primary portion 12b. Another optical parts such as the first lens 124, and the first to fourth cylindrical members 141 to 144, are aligned in the Y direction to the optical axis of the semiconductor laser 121, and permanently fixed to each other by the YAG laser welding. The level of thus aligned and fixed optical axis measured from the frame 10 does not always coincide with each TOSA 12, because dimensions of the optical components intrinsically includes tolerance and positional fluctuation of each components in the manufacturing inevitably occurs. In the conventional optical transceiver, the ferule in the optical connector and the sleeve in the TOSA 12 are not always mated with each other in precise, because the TOSA 12 with such uneven to optical axis is fixed to the frame 10 without any adjustment, namely, leaving the unevenness of the level of the optical axis. When forcing the level of the optical axis to coincide with each other, mechanical damage is brought and optical coupling efficiency deteriorates.

Figure 4:
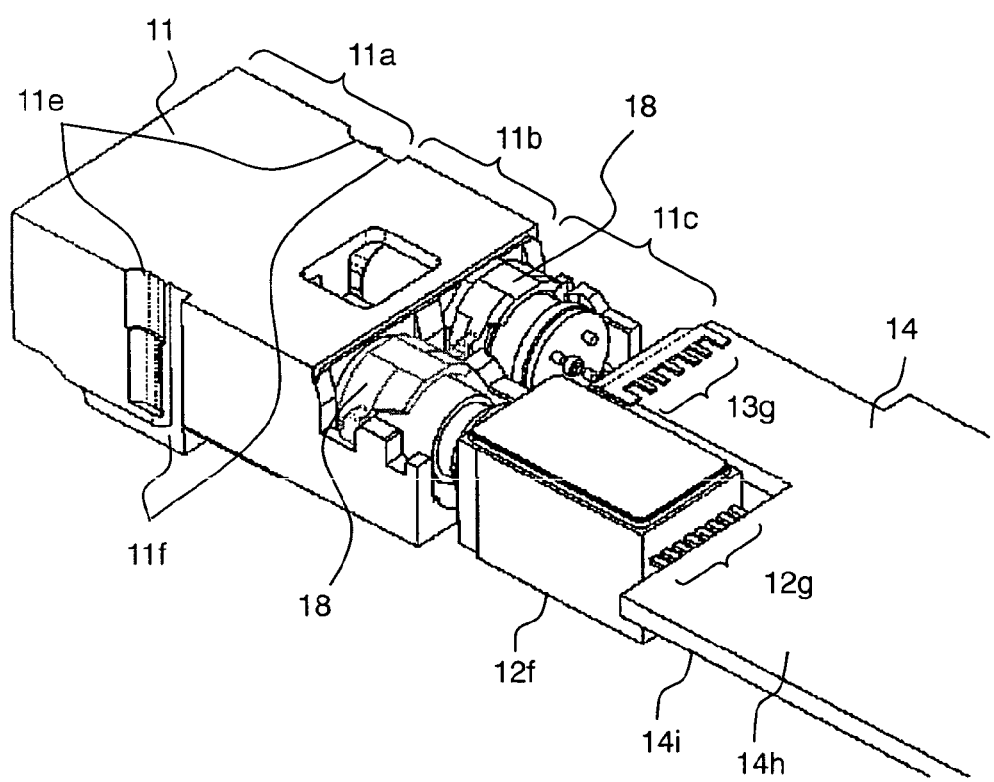
FIG. 4 shows an arrangement of the optical receptacle, the optical subassemblies and the substrate.
Figure 5:
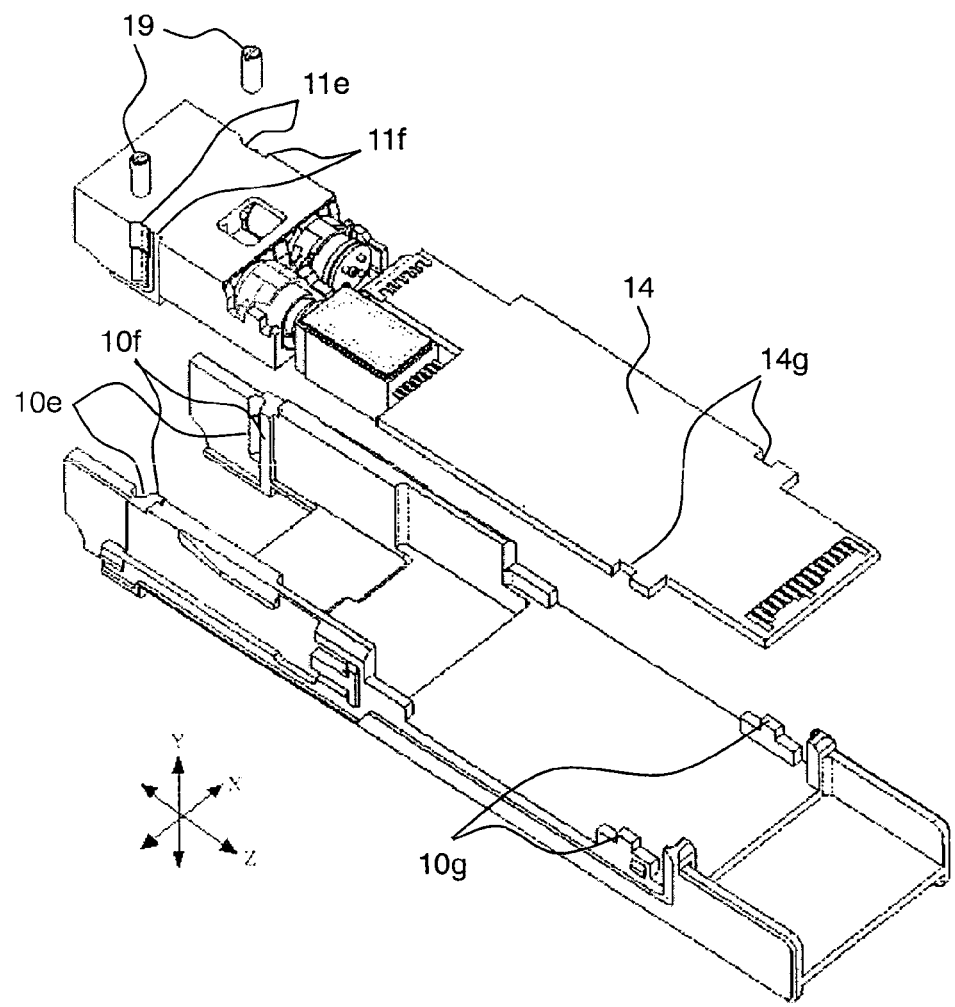
FIG. 5 shows a positional relation and a method for fixing the assembled optical receptacle, the optical subassemblies and the substrate, to the frame.

FIG. 4 shows the assembled body of the optical receptacle 11, the TOSA 12, the ROSA 13 and the substrate 14. The TOSA 12 and the ROSA are positioned in Z-direction, parallel to the optical axis, by contacting their flanges 12d, 13d to the partition wall. On the rear side of the flange 12d, 13d, the holders 18 that is made of poly-phenylene sulfide (PPS) and U-shape having two arms, are inserted to the optical receptacle 11 such that the holder 18 holds the sleeve portion 12a, 13a between their arms and the tip of the arm are inserted in the optical receptacle 11. The bottom 12f of the primary portion 12b directly touches the third portion 10c of the frame 10, so that heat generated from the thermoelectric element 124 is effectively dissipated to the frame 10.

The lead terminals of the TOSA 12 are connected to one surface of the substrate 14, which is the back surface in FIG. 4, while the flexible board 13g from the ROSA 13 is connected to the other surface of the substrate 14. The circuit block concerning to the TOSA 12 and the circuit block to the ROSA 13 are separately installed to respective surfaces of the substrate, and a conductive pattern with low impedance, such as ground line and a power supplying line, is intermediately inserted therebetween. This configuration of substrate 14 enables to electrically isolate these circuit blocks.

Second Embodiment

Next, a method for assembling the optical transceiver of the present invention will be described.

Assembling of the TOSA

The semiconductor laser 121 is mounted on the predetermined position on the thermoelectric element 124 via the heat sink 122. On the thermoelectric element 124, the first lens 125 is assembled, simultaneously. The semiconductor laser 121 is wire-bonded to a wiring pattern extending from the lead terminal 12g, whereby the laser 121 is enabled to emit light by biasing through the lead terminal 12g. The cylindrical members 141 to 144 are assembled to the box-shaped primary portion 12b of the TOSA 12. Within the fourth cylindrical member provides the second lens and the fourth member is permanently fixed to the primary portion 12b by the YAG-laser welding. The first and second cylindrical members 141, 142, the sleeve 131 and the stub 132 are assembled in advance. Preparing a dummy fiber providing a ferule in the tip thereof and connected to an optical power meter, and the ferule is inserted in the sleeve 131. Thus assembled but not fixed cylindrical members 141 to 143 is placed on the fourth cylindrical member 144.

Next, alignment of the cylindrical members 141 to 143 is executed. First, the semiconductor laser 121 practically emits light by supplying current thereto. The first to third cylindrical members 141 to 143 are aligned in z-direction by sliding the third member 143 on the outer surface of the fourth cylindrical member 144, as monitoring the output power by the power meter. After alignment, the third cylindrical member 143 and the fourth cylindrical member 144 are permanently fixed by the YAG-laser welding. Subsequently, the assembled first and second cylindrical members 141 and 142 are aligned their positions normal to the optical axis by sliding the assembled body on the end face of the third cylindrical member 143 as monitoring the optical power by the power meter. After completion of the alignment, the assembled first and second cylindrical members 141, 142 are welded to the third member 143. Thus, the assembly of the TOSA 12 has completed. The sleeve portion 13a of the ROSA 13 may be processed similar procedure to that of the TOSA 12.

Assembling the Substrate, the Subassembly and the Optical Receptacle

The head portion 12c of the TOSA 12 is inserted into the opening provided in the partition wall that divides the second portion 11b from the third portion 11c of the optical receptacle 11. The head portion 13c of the ROSA 13 is similarly inserted in the corresponding opening. After inserting, two holders 18 are fixed to the optical receptacle such that their arms hold the TOSA 12 and the ROSA 13, thereby fixing the TOSA 12 and the ROSA 13 to the optical receptacle 11.

Next, the TOSA and the ROSA 13 are connected to the substrate 14. In this step, positional relationship in x and directions between the substrate and the assembled body are secured by using a fixture that simulates the frame 10. The position in X- and Z-directions of the TOSA 12 is optional because the bottom 12f of the TOSA 12 may slide on the third portion 10c of the frame 10 within a predetermined range. For the ROSA 13, since the connection to the substrate 14 is performed by the flexible substrate 13g, the positional adjustment to the substrate 14 is far ease compared to the TOSA 12. After defining the relative position in x- and z-directions of the substrate, the lead terminals 12g of the TOSA 12 and the flexible board 13g are soldered to the substrate 14.

Assembling the Combined Optical Receptacle, the Optical Subassemblies and the Substrate to the Frame Next, the assembled body of the optical receptacle 11, the TOSA 12, the ROSA 13 and the substrate 14 are integrated with the frame 10. The assembled body is fixed to the frame 10 by screws 17 as a thermal resin is tightly interposed between the bottom 12f of the TOSA 12 and the third portion 10c of the frame 10. The groove 11f formed in the outer surface of the optical receptacle 11 mates with the lib 10f formed in the inner surface of the frame 10. Simultaneously, the notch 14 provided in the side edge of the substrate 14 mates with the projection 10g formed at the rear side of the third portion 10c of the frame 10. Mating the groove 11f with the lib 10f defines the position in the z-direction of the assembled body of the optical receptacle 11, the TOSA 12, the ROSA 13, while the mating the notch 14g with the projection 10g defines the position in the z-direction of the substrate 14.

Thus assembled body is fixed to the frame 10 by tightening the screw inserted into the composite bore constituted by the hole 10e formed in the inner surface of the frame 10 and another hole 11e in the outer surface of the optical receptacle 11. The hole 10e in the frame 10 provides the thread, while the corresponding hole 11e of the optical receptacle 11 does not provide any thread therein. Accordingly, the level of the optical axis in the y-direction, which is uniquely defined by the TOSA 12, may be optional to the frame 10. When the thread is also provided in the hole 11e of the optical receptacle not only in the hole 10e of the frame 10, the level of the optical axis in the y-direction will vary as turning the screw.

After integrating the optical receptacle 11, the TOSA 12, the ROSA 13, and the substrate 14 with the frame 10, the cover 15 is set and the actuator 16 is attached to the body, thus the optical transceiver has completed.

Third Embodiment

Figure 6:
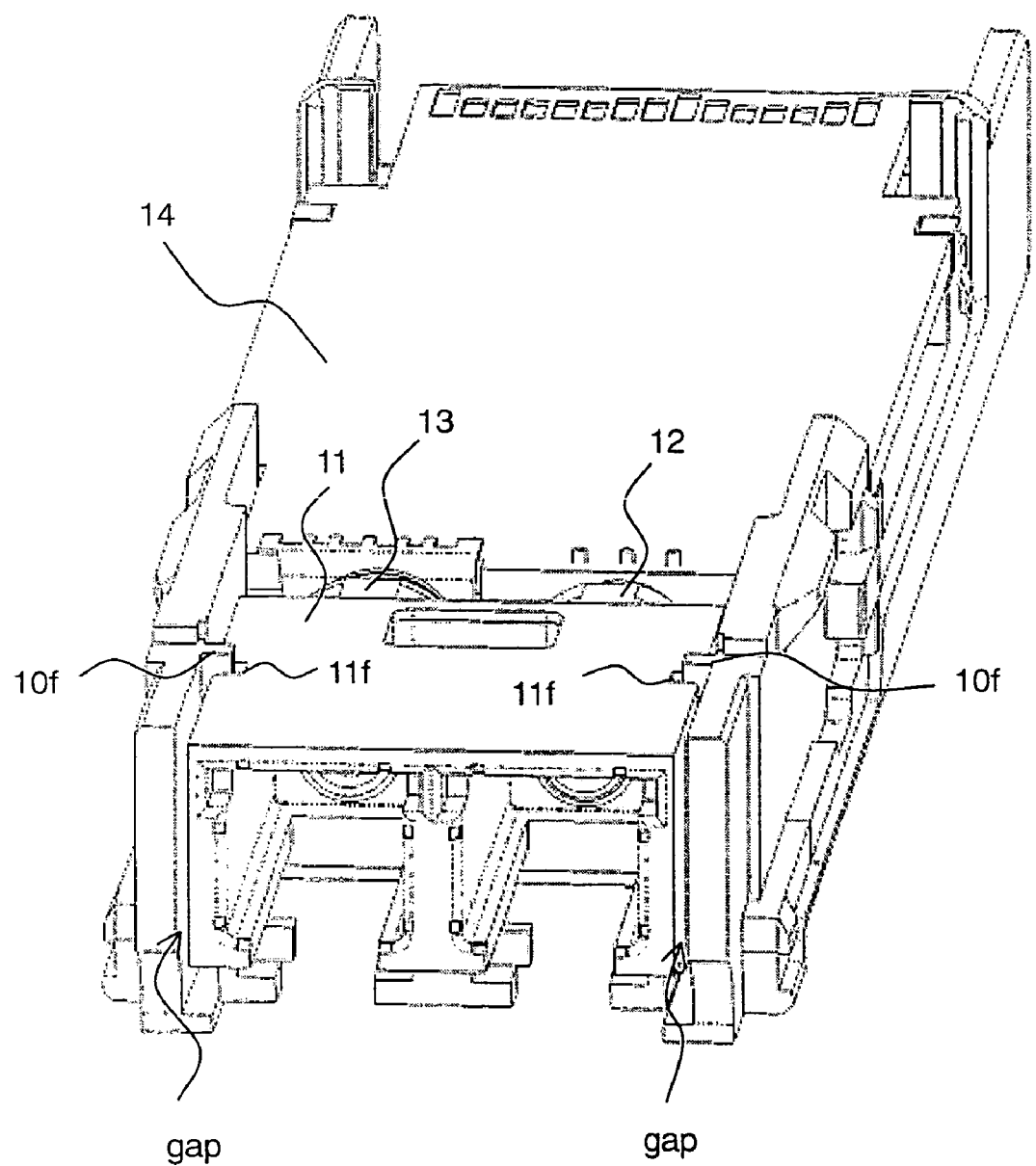
FIG. 6 shows another method for fixing the assembled optical receptacle, the optical subassemblies and the substrate, to the frame.

FIG. 6 is a perspective view showing another embodiment of the present 5 invention. The third embodiment is different in its configuration by a point that an adhesive instead of the screw combines the optical receptacle 11 and the frame 10. The optical transceiver shown in FIG. 7 does not provide screw holes constituted by the hole 10e of the frame 10 and another hole 11e of the optical receptacle 11. In the present embodiment, the position of the optical receptacle 11 relative to the frame 10 is optional in both the x-direction and the y-direction. Namely, the positional relation ship of the optical receptacle 11 and the frame in the y-direction is optionally determined, while that in the x-direction is optionally determined within a gap between the optical receptacle 11 and the frame 10.

Fourth Embodiment

Figure 7A:
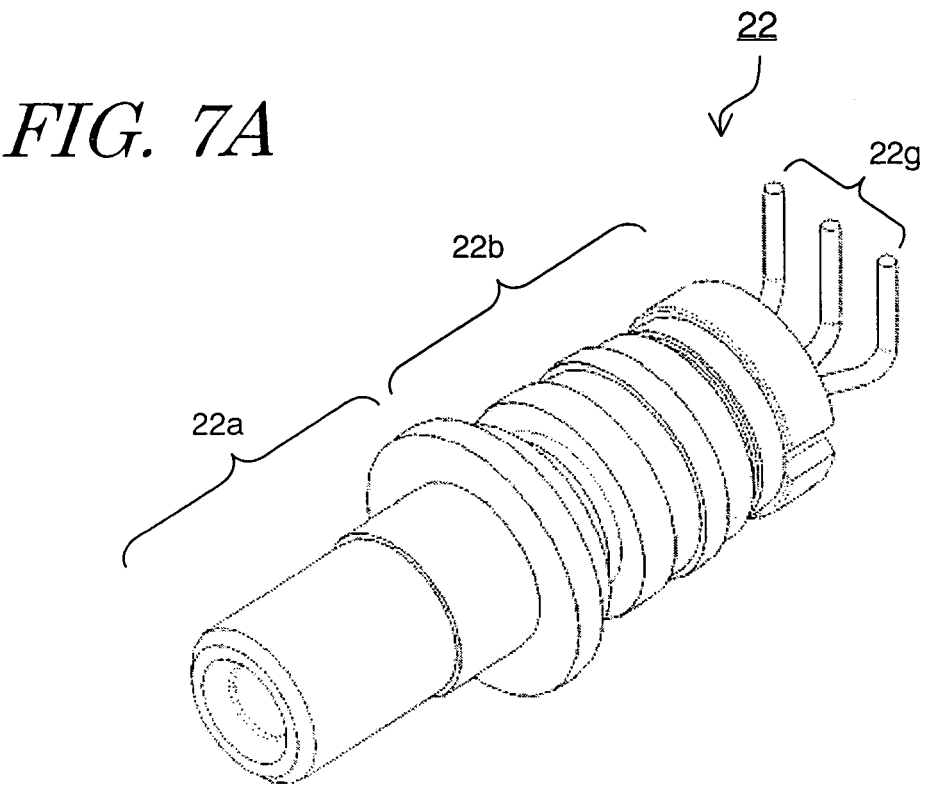
FIG. 7A is a perspective view of the transmitting optical subassembly of the second embodiment.
Figure 7B:
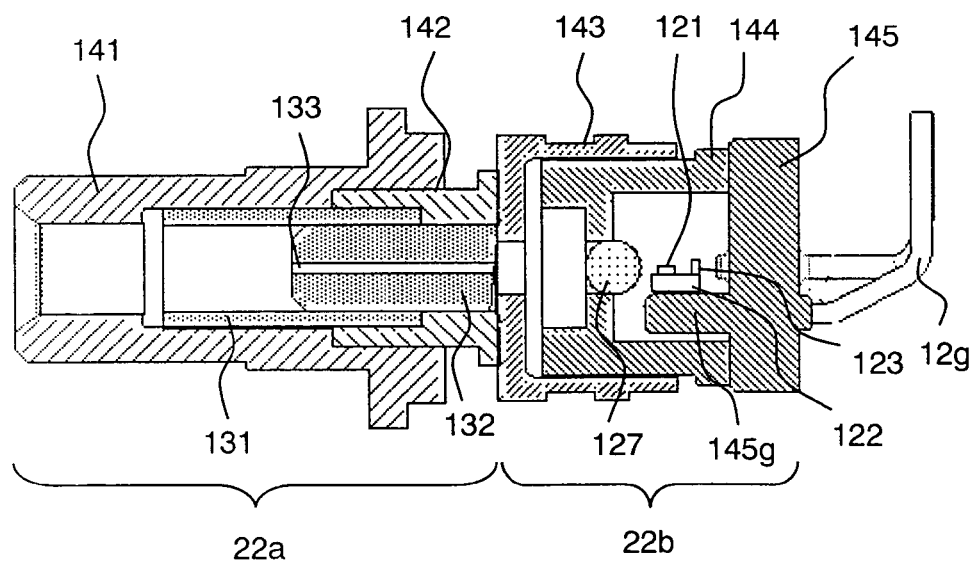
FIG. 7B is a cross sectional view of the transmitting optical subassembly of the second embodiment.
Figure 8:
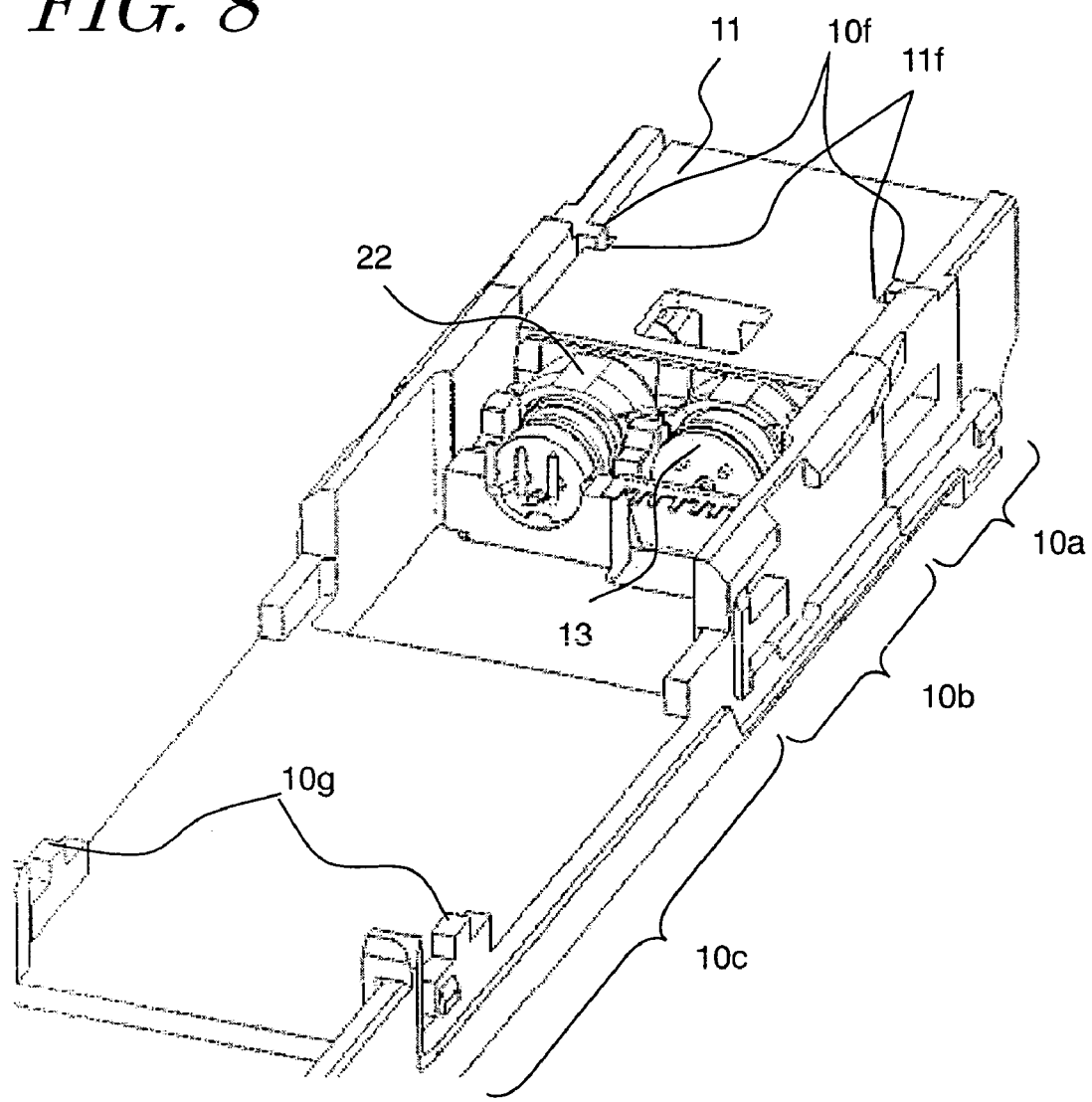
FIG. 8 shows a positional relation between the assembled optical receptacle, the optical sub assemblies, and the frame.

FIG. 7A and FIG. 7B shows a fourth embodiment of the present invention. In the first embodiment shown in previous drawings comprises the TOSA having a box-like external shape, within which the thermoelectric element is installed. Accordingly, the dimension thereof is expanded, which prevents a miniaturized and low-cost optical transceiver from supplying commercially to the field. In the present embodiment of the optical transceiver, a TOSA 22 has a co-axially external shape as a primary portion 22b. The primary portion 22b of the TOSA 22 has a disk-like stem 145 and the fourth cylindrical member 144 that acts as the lens holder for securing the lens 143. The plural lead terminal extends from the stem 145 and connects to the substrate 14.

The semiconductor laser 121 is mounted on the sub-mount 145g via the heat sing 122. The sub-mount is projected from the stem 145f such that the edge surface of the semiconductor laser, light emitted therefrom, may be faced in the z-direction. On the stem 145f provides the photodiode 123 for monitoring the output power of the semiconductor laser 121. The configuration of the sleeve portion 22a, and the positional relation ship between cylindrical members 141 to 144 are same with those previously explained in the first embodiment.

In the case that the TOSA having such co-axial external shape is integrated with the optical receptacle 11, the outer surface of the stem 145f is placed and attached on a structure having a cylindrical surface fitting to the external shape of the stem 145f. This fitting structure is formed in the second portion 11b of the optical receptacle 11. Since the stem 145f of the TOSA 22 is tightly placed on the structure, not only a heat dissipation path from the stem 145a to the frame 10 is secured, but also the position of the TOSA 22 in the y-direction is defined. Thus assembled TOSA 22 and the optical receptacle 11 are fixed to the frame 10 by the same method, for example by the screw shown in the first embodiment or by the adhesive in another embodiment, the optical axis of the TOSA 22 may be defined independently and optionally to the frame 10.

What is claimed is:

1. An optical transceiver module having an optical semiconductor device coupled to an optical fiber via an optical connector attached to an end of said optical fiber, said optical transceiver comprising:
   at least one optical subassembly installing said optical semiconductor device therein, said optical subassembly including a sleeve portion with a cylindrical shape and a primary portion with a box-shape;
   an optical receptacle receiving said sleeve portion of said optical subassembly to optically couple said optical fiber with said optical semiconductor device by mating said optical connector with said sleeve portion of said optical subassembly;
   a substrate electrically connected to said optical subassembly;
   a frame for installing said optical subassembly, said optical receptacle and said substrate; and
   a cover for covering said optical subassembly, said optical receptacle and said substrate by cooperating with said frame,
   wherein said optical receptacle assembled with said optical subassembly is movably mounted to said frame and said primary portion of said optical subassembly is fixed in contact with said frame.

2. The optical transceiver module according to claim 1, wherein said optical subassembly and said substrate are rigidly positioned to said frame.

3. The optical transceiver module according to claim 1, wherein said frame has a major surface where said optical receptacle, said optical subassembly and said substrate are installed thereon, and
   wherein said optical receptacle assembled with said optical subassembly is fixed to said frame in a direction across said major surface of said frame.

4. The optical transceiver module according to claim 3, wherein said frame has a hole with a thread in an inner surface thereof and said optical receptacle has another hole cooperating with said hole of said frame, said another hole providing no thread in an inner surface thereof, said hole of said frame forming a screw hole by cooperating with said another hole of said optical receptacle, and
   wherein said optical receptacle assembled with said optical subassembly is fixed to said frame by a screw tightened in said screw hole.

5. The optical transceiver module according to claim 3, wherein said optical receptacle assembled with said optical subassembly is fixed to said frame by adhesive filled therebetween.

6. The optical transceiver module according to claim 1, wherein said primary portion of said optical subassembly has a box-shape having a bottom that faces a major surface of said frame and is in contact with said major surface in said bottom.

7. The optical transceiver module according to claim 6, wherein said optical subassembly includes a thermoelectric element therein for controlling a temperature of said optical semiconductor device.

8. The optical transceiver module according to claim 1, wherein said primary portion of said optical subassembly has a disk-shape and said frame has a receiving structure with a cylindrical surface corresponding to said disk-shape, and
   wherein said optical subassembly is positioned to said frame by fitting said disk-shape to said cylindrical surface of said frame.

9. The optical transceiver module according to claim 1, wherein said optical subassembly is a transmitting optical subassembly.

10. The optical transceiver module according to claim 1, wherein said optical subassembly is a receiving optical subassembly.

11. An optical transceiver module, comprising:

a transmitting optical subassembly including a primary portion and a sleeve portion, said primary portion having a box-shape and a plurality of lead terminals, a laser diode being installed in said primary portion of said transmitting optical subassembly, said sleeve portion having a cylindrical shape and extending from said primary portion;

a receiving optical subassembly including a primary portion and a sleeve portion, said primary portion having a co-axial shape and a flexible circuit board, a photodiode being installed in said primary portion of said receiving optical subassembly, said sleeve portion of said receiving optical subassembly having a cylindrical shape and extending from said primary portion of said receiving optical subassembly; and a substrate installing a plurality of electronic circuit elements thereon;

an optical receptacle configured to receive said sleeve portion of said transmitting optical subassembly and said sleeve portion of said receiving optical subassembly; and a frame configured to firmly mount said substrate and to movably mount said optical receptacle assembled with said transmitting optical subassembly and said receiving optical subassembly with said primary portion of each of said transmitting and said receiving optical subassemblies being fixed into contact with said frame.

wherein said transmitting optical subassembly is electrically connected to said circuit elements via said lead terminals and said receiving optical subassembly is electrically connected to said circuit elements via said flexible circuit board.

12. The optical transceiver module according to claim 11, wherein said substrate has a first portion and a second portion, said first portion extending from said second portion and being located in a side by side position with said transmitting optical subassembly, said first portion being electrically connected to said receiving optical subassembly via said flexible circuit board and said second portion being electrically connected to said transmitting optical subassembly via said lead terminals.

13. The optical transceiver module according to claim 11, wherein said transmitting optical subassembly includes a thermoelectric element therein.

14. The optical transceiver module according to claim 11, further including an electric connector fixed to said substrate.

\* \* \* \* \*